US008081771B2

(12) United States Patent
Harrington et al.

(10) Patent No.: US 8,081,771 B2
(45) Date of Patent: Dec. 20, 2011

(54) AUTOMOBILE PERSONAL RADIO RECORDER

(75) Inventors: Kendra Harrington, Irvine, CA (US); Allen Huotari, Garden Grove, CA (US)

(73) Assignee: Cisco Technology, Inc., San Jose, CA (US)

( * ) Notice: Subject to any disclaimer, the term of this patent is extended or adjusted under 35 U.S.C. 154(b) by 908 days.

(21) Appl. No.: 12/109,384

(22) Filed: Apr. 25, 2008

(65) Prior Publication Data

US 2009/0268924 A1 Oct. 29, 2009

(51) Int. Cl.
*H04B 1/00* (2006.01)
(52) U.S. Cl. .......................................................... 381/86
(58) Field of Classification Search .................. 381/86, 381/34, 35, 91, 110, 61, 122, 26, 81, 77; 341/110; 711/103; 704/270, 201, 103; 364/400.01; 455/344, 345; 360/5, 137; 369/6, 21, 84, 369/8, 9, 10, 12
See application file for complete search history.

(56) References Cited

U.S. PATENT DOCUMENTS

| | | | | |
|---|---|---|---|---|
| 5,263,199 A * | 11/1993 | Barnes et al. | ................. | 455/344 |
| 5,671,195 A * | 9/1997 | Lee | .................... | 369/7 |
| 6,018,504 A * | 1/2000 | Sakamoto et al. | ................ | 369/7 |
| 2008/0032663 A1* | 2/2008 | Doyle | ........................... | 455/345 |

* cited by examiner

*Primary Examiner* — Dao H Nguyen
*Assistant Examiner* — Tram H Nguyen
(74) *Attorney, Agent, or Firm* — Patent Capital Group

(57) ABSTRACT

In one embodiment, an audio recorder is disclosed that interfaces with an automobile radio. The audio recorder includes a radio tuner that receives radio frequency signals and converts the signals to audio output and an audio comparator that compares audio output from the radio tuner with audio output of the automobile radio and tunes the radio tuner until the audio output of the audio tuner is synchronized with the audio output of the automobile radio. An audio storage device is activatable to record the audio output of the radio tuner for later playback.

21 Claims, 5 Drawing Sheets

AUTOMOBILE PERSONAL RADIO RECORDER

TECHNICAL FIELD OF THE INVENTION

The present disclosure relates generally to an automobile audio system and more particularly to a device for recording radio broadcasts from an automobile audio system for later playback.

BACKGROUND

In order to relieve the sometimes monotonous task of driving and for providing entertainment and information for the driver and passengers, the vast majority of automobiles are equipped with AM/FM or satellite radios. Indeed, many radio broadcasts are targeted at automobile travelers, for example, "drive time" segments and traffic information broadcasts.

Many people are in their car at the same time each day, for example peak hour to and from work, and develop a loyalty for a particular program. Other listeners include commercial travelers, such as courier drivers, who spend most of the day in the car or truck, but need to frequently stop, for example, to make deliveries or collections.

There are many situations, however, when listening to the radio is stopped or interrupted prior to the end of the desired program. This includes arrival at the destination, having to stop to make a pick-up or delivery, or an increase in traffic noise. Also, a change in the time of a regular journey may mean missing out on listening to all or part of a person's favorite program. A program may also be forgotten or missed due to other passengers in the automobile wanting to listen to a different station.

DESCRIPTION OF EXAMPLE EMBODIMENTS

Figure 1:
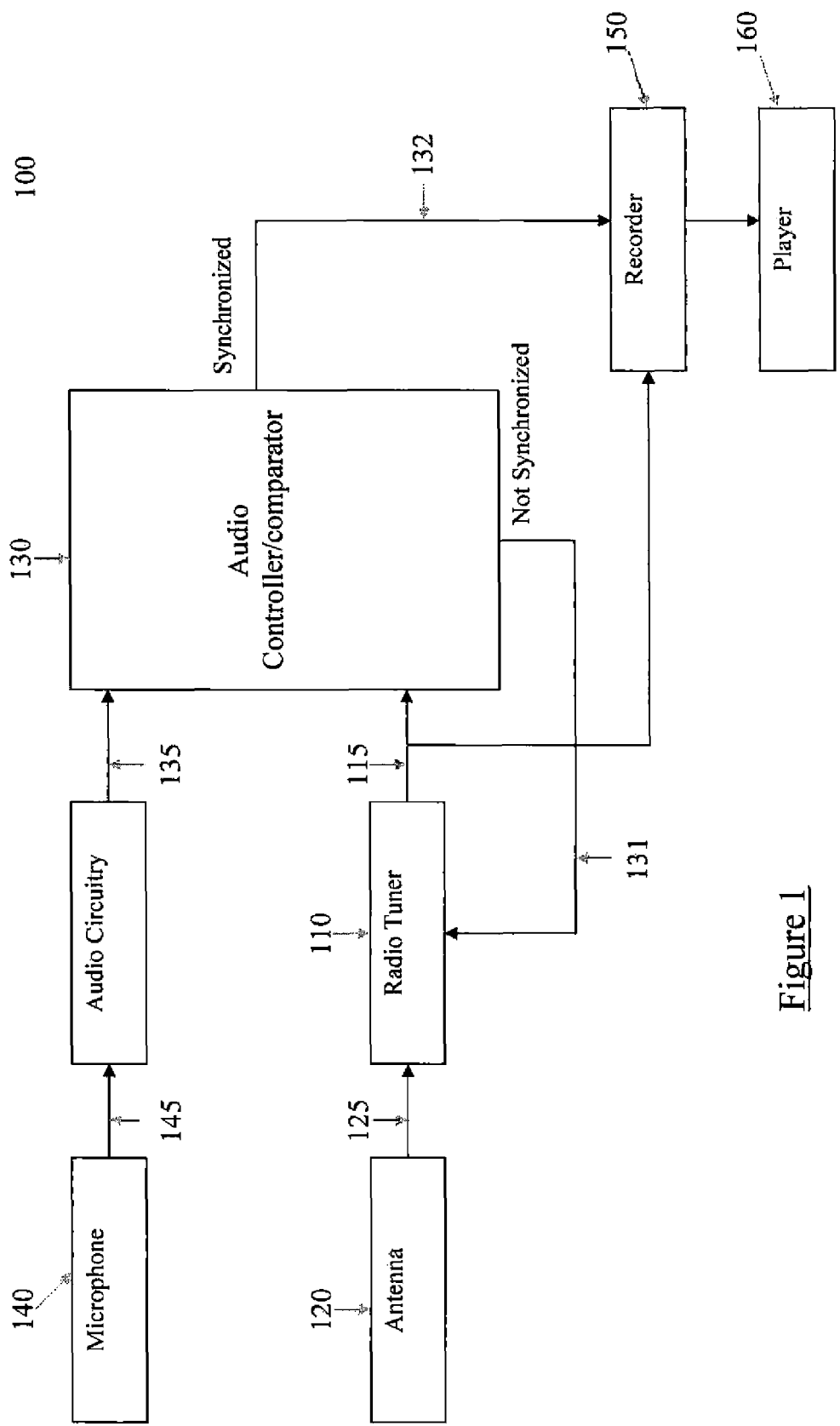
FIG. 1 shows a block diagram of an embodiment of the automobile audio recorder.

The embodiments of the invention relate to an audio recorder that interfaces with an automobile radio. The audio recorder includes a radio tuner that receives radio frequency signals and converts the signals to audio output and an audio controller/comparator that compares the audio output from the radio tuner with audio output of the automobile radio. The audio controller/comparator tunes the radio tuner until the audio output of the audio tuner synchronizes with the audio output of the automobile radio. The audio recorder also includes an audio storage device, which records the audio output of the radio tuner when activated by the audio controller/comparator.

The embodiments of the invention will now be described with reference to the drawings, wherein like reference numerals are used to refer to like elements throughout.

Referring to FIG. 1 there is a shown a block diagram of an audio recorder that interfaces with an automobile radio. The audio recorder 100 includes a radio tuner 110 that operates to receive radio frequency signals 125 sent via an antenna 120 and to convert the radio frequency signals to an audio output 115.

In an embodiment of the invention the audio recorder 100 includes an audio controller/comparator 130 that compares the audio output 115 with audio output 135 from an existing automobile radio (not shown) in an automobile. Audio output 135 from the automobile radio may be connected directly to the controller/comparator 130. Alternatively, as shown in FIG. 1, sound from the speakers of the automobile radio may be detected by microphone 140 and processed by suitable audio circuitry 145 before being directed to the audio controller/comparator 130. The audio controller/comparator 130 operates 131 to tune the radio tuner 110 until the audio output 115 from the radio tuner 110 synchronizes with the audio output 135 from the automobile radio. The audio controller/comparator 130 also operates 132 to activate an audio recorder 150 that records the audio output 115 of the radio tuner 110. Once recording commences the automobile radio may be tuned to another station or even turned off while the selected program is recorded by the audio recorder 150. A user may record radio programs as desired, independently of the automobile radio.

The audio controller/comparator 130 may operate in the following manner:
 a) a timer in the controller comparator 130 is started when the radio tuner 110 is activated;
 b) the signals 135 and 115 are compared in the controller/comparator 130 for the duration of the timer period,
 c) synchronization is declared if a comparator threshold in the controller/comparator 130 is exceeded for the duration of the timer period;
 d) if the threshold is not exceeded the timer is reset, the radio tuner 110 is tuned and the process recommences at a).

The comparison function is an integration of the signals 135 and 115. The integration can be performed using digital sampling techniques by sampling each signal 115 and 135, adding the samples together, and accumulating sequential additions for the duration of the timer. If the total exceeds a threshold the signals are accepted as being synchronized, if not they are considered to be unsynchronized and the process repeats. The threshold is set at a level to ensure an acceptable accuracy of synchronization detection. The threshold level is a design parameter and may be determined and set by a manufacturer or installer. Alternatively, the threshold level may be determined and set by a user or adjustable by a user.

The recorded audio output may be replayed at any time using player 160. The player 160 is conveniently configured to replay recorded audio through the existing automobile sound system, although it may be configured to operate independently with separate audio circuitry and speakers (not shown).

Figure 2:
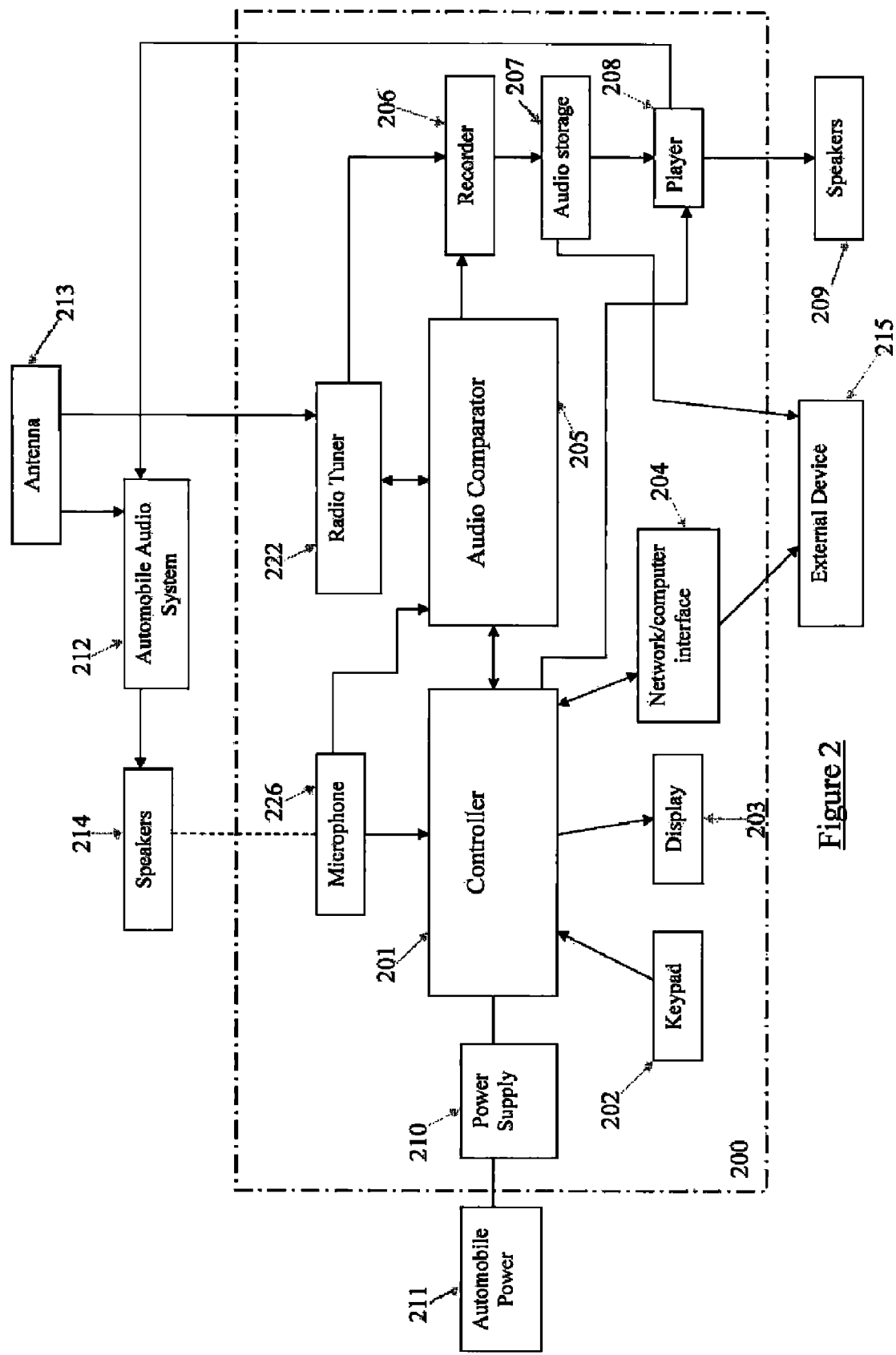
FIG. 2 shows a more detailed block diagram of another embodiment of the automobile audio recorder.

Another embodiment of an audio recorder for an automobile radio is shown in FIG. 2. The embodiment of FIG. 2 shows additional details not shown in the basic schematic of FIG. 1. In the embodiment of FIG. 2 some of the functions performed by the controller/comparator in the embodiment of FIG. 1 are performed in a separate controller.

The audio recorder 200 includes a controller 201 that controls operation of the audio recorder 200. A user provides input to the controller 201 via a keypad 202 to perform various functions as described below. A display 203 provides visual feedback to the user of the functioning of the audio recorder 200. Alternatively, visual feedback to the user may be provided by the display of automobile audio system 212. A power supply 210 draws power from the automobile electrical system 211. The power supply 210 is able to be controlled by the controller 201 to shut down the audio recorder 200 if the power drain is excessive. Only the control signal connection is shown in FIG. 2. Persons skilled in the field will recognize that there may be multiple power connections between the power supply 210 and the other components of the audio recorder 200.

The controller 201 is in signal connection with an audio comparator 205. The audio comparator 205 receives audio output from a radio tuner 222 and a microphone 226. The audio output may be in the form of sound received from speakers, voltage signals received from speaker input, analogue or digital signals produced at a receiver, or the like. As described with reference to the first embodiment, the audio comparator 205 compares the audio outputs from the radio tuner 222 and the microphone 226. The audio comparator 205 tunes the radio tuner 222 until the audio output from the radio tuner 222 synchronizes with the audio output from the microphone 226. The audio comparator 205 activates a recorder 206 to record the audio output from the radio tuner 222 and store the recording in audio storage 207.

The recorded audio output may be replayed from the audio storage 207 using a player 208. The player 208 may be configured to replay the recorded audio output from the audio storage 207 through the automobile audio system 212 and its speakers 214. Alternatively the recorded audio output from the audio storage 207 may be replayed through independent speakers 209.

The radio tuner 222 receives radio broadcasts via an antenna 213. The antenna 213 may be particular to the audio recorder or it may be the antenna which is part of the automobile audio system.

User input to the controller 201 may also be provided through a network/computer interface 204 by an external device 215 such as a computer, cell phone, personal digital assistant (PDA) or media player. The network/computer interface 204 may also allow downloading of the recorded audio output from the audio storage 207 to an external device 215 for external playback.

User input to the controller 201 may also be provided by voice commands received by the microphone 226. Voice commands may include simple commands such as 'stop', 'record' or may be programmed to perform more complex actions. Alternatively, user input to the controller 201 may be provided through the keypad 202 via audio prompts given by the player 208 upon activation by the controller 201. Audio prompts may include "press 1 to play back the last recording" or "press 2 to list all available recordings".

Figure 3:
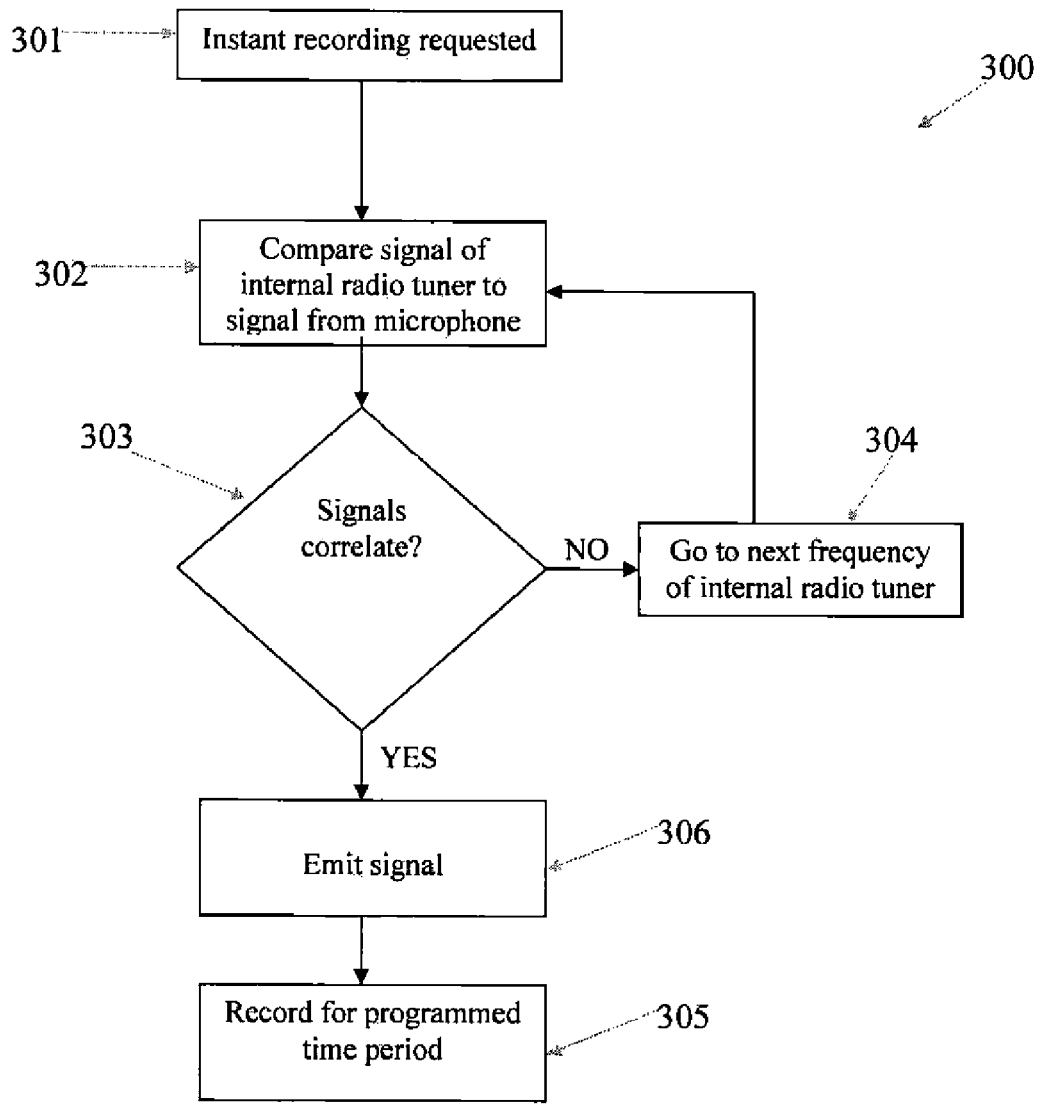
FIG. 3 shows a decision flow chart for instant recording of a radio broadcast.

Referring to FIG. 3, there is shown the sequence of steps 300 undertaken by the device to instantly record a radio broadcast. When a request for instant recording is received 301 the controller 201 instructs the audio comparator 205 to compare 302 the output of the internal radio tuner 222 to the signal from the microphone 226. If the signals synchronize 303, a signal is emitted 306 and the comparator 205 instructs the recorder 206 to record for the programmed time period 305. The signal emitted 306 may be visual or aural. If the signals do not synchronize 303 the comparator 205 instructs the radio tuner 222 to tune to another frequency 304, and the microphone 226 signal and the output of the radio tuner are compared again 302. The comparison of signals continues until the two signals synchronize 303.

The comparator 205 may be programmed by the user to select frequencies on only one of AM, FM or satellite bands. Alternatively, the controller 201 may learn which frequencies are listened to most often by the user and instruct the radio tuner 222 to tune to these frequencies for the comparator 205 to compare the signals 302 before undertaking a full scan.

Figure 4:
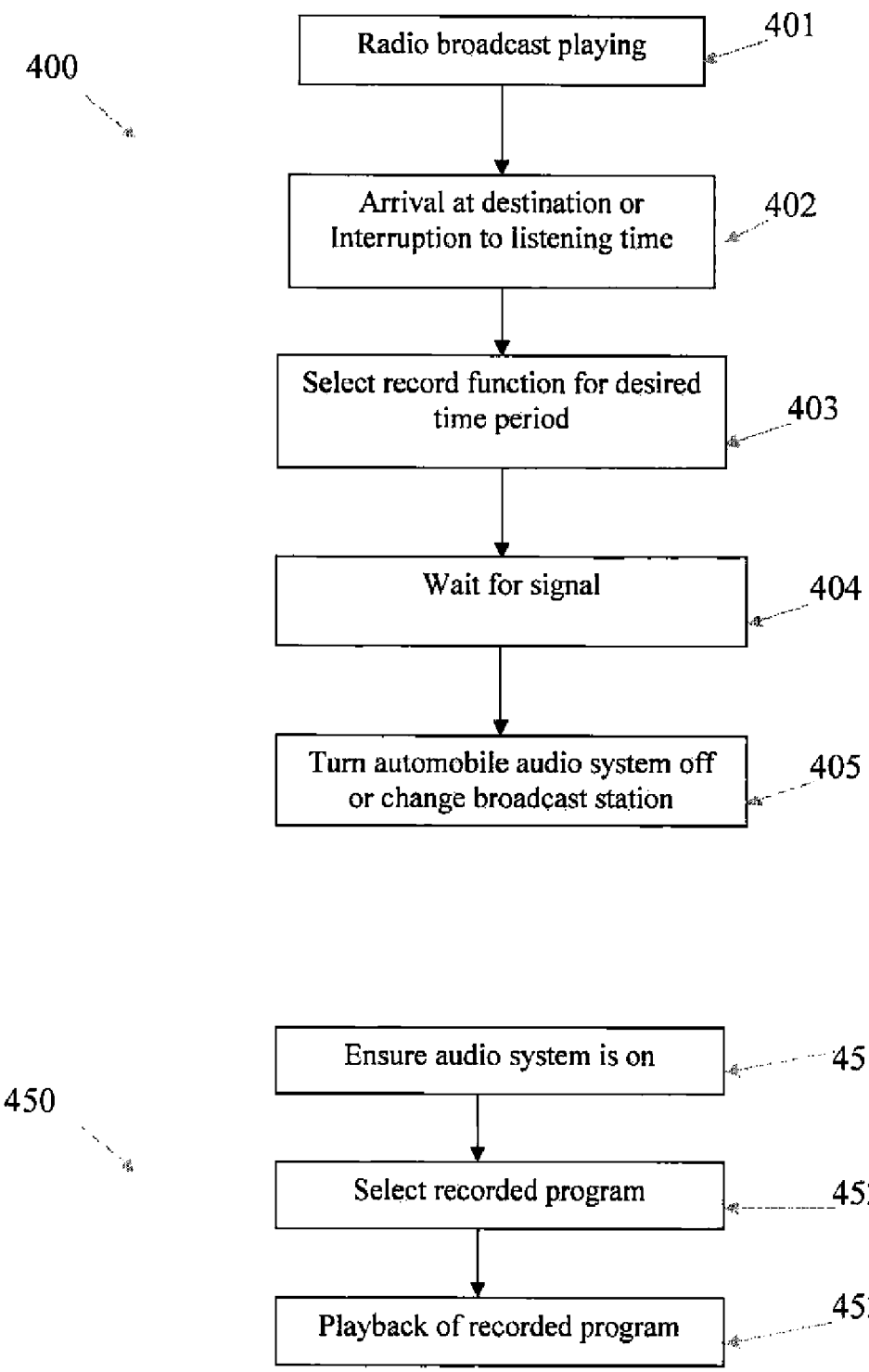
FIG. 4 shows a flow chart of the steps undertaken by a user for instant recording and playback of a radio broadcast by the device.

FIG. 4 shows the steps 400 undertaken by the user when requesting instant recording. A radio broadcast is playing 401 until an interruption such as arrival at destination or a desire to change stations occurs 402. The user then selects a record function for a desired time period 403. After waiting 404 for a signal 306 to be emitted indicating that the audio recorder 200 is recording, the user may then choose to turn the automobile audio system 212 off or change the broadcast station 405.

The steps undertaken by a user to playback recorded audio 450 are also shown in FIG. 4. While the audio recorder 200 is switched on 451, the user selects a recorded program 452. The controller 201 then directs the player 208 to playback the recorded program 453 either through the automobile audio system 212 or through independent speakers 209.

Figure 5:
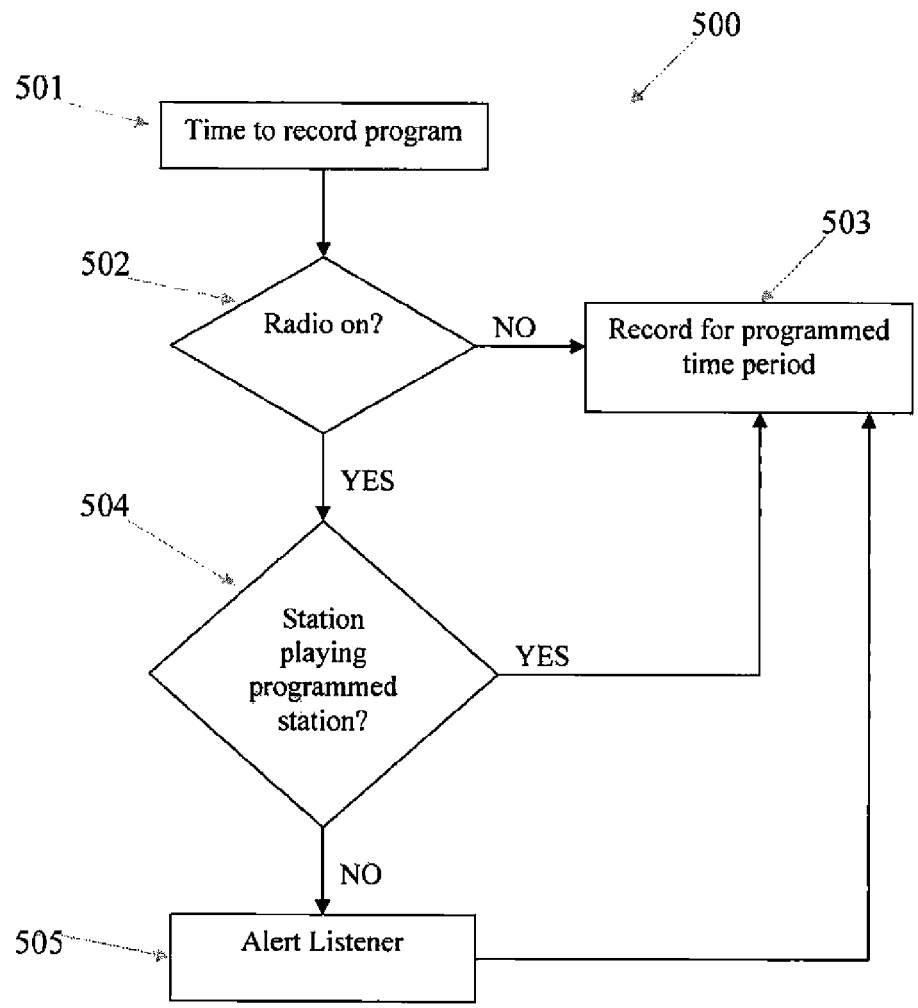
FIG. 5 shows a decision flow chart for pre-programmed recording of a radio broadcast.

Referring to FIG. 5, there is shown the sequence of steps 500 for recording a programmed period of time. When the programmed time to record arrives 501, a determination is made by the audio controller 201 of whether the automobile audio system 212 is on 502. If the automobile audio system 212 is turned of, the audio controller 201 directs the radio tuner 222 to tune to the programmed radio station and the recorder 206 to record to the audio storage 207.

If the automobile audio system 212 is turned on, the controller 201 directs the comparator 205 to compare the signal 504 from the microphone 226 with the programmed radio station to which the radio tuner 222 is tuned. If the signals synchronize, the recorder 206 is directed to record for the programmed time period 503. If the signals do not synchronize, the controller 201 directs the player 208 to emit a signal to alert the listener that a programmed time to record is about to occur. The audio recorder 200 then proceeds to record the radio station to which radio tuner 222 is tuned for the programmed time period as previously described.

What is claimed is:

1. An apparatus, comprising:
   a radio tuner that receives radio frequency signals and converts the signals to audio output;
   an audio comparator that compares audio output from the radio tuner with audio output from an automobile radio and tunes the radio tuner until the audio output of the radio tuner is synchronized with the audio output of the automobile radio; and
   an audio storage device activatable by the audio comparator to record the audio output of the radio tuner, wherein the comparing includes:
   sampling the audio output from the radio tuner;
   sampling the audio output from the automobile radio;
   accumulating resultants of the sampling; and
   identifying a synchronization based on a threshold associated with the resultants.

2. The apparatus of claim 1 wherein the audio comparator further comprises a digital sampler for sampling the audio output from the radio tuner and the audio output from the automobile radio.

3. The apparatus of claim 2 wherein the audio comparator further comprises a timer for determining a time period for operation of the digital sampler.

4. The apparatus of claim 1 further comprising a microphone that detects audio output from the automobile radio and directs the audio output to the audio comparator.

5. The apparatus of claim 1 further comprising a player for selecting a recorded audio output for playback.

6. The apparatus of claim 5 further comprising speakers independent of the automobile radio for playing recorded audio output.

7. The apparatus of claim 1 further comprising an antenna that receives radio frequency signals and directs the radio frequency signals to the radio tuner.

8. The apparatus of claim 1 further comprising a controller that controls operation of the audio comparator and audio storage device.

9. The apparatus of claim 1 further comprising a display that provides visual feedback of the operation of the apparatus.

10. The apparatus of claim 1 further comprising a network/computer interface to an external device.

11. The apparatus of claim 10 wherein the network/computer interface allows downloading of recorded audio output to the external device.

12. The apparatus of claim 1 further comprising a power supply wherein the power supply is controlled to shut down if excessive power drain is detected by the audio recorder.

13. A method comprising:
receiving radio frequency signals via a radio tuner and converting the signals to audio output;
comparing the audio output from the radio tuner with audio output of an automobile radio;
tuning the radio tuner until the audio output of the radio tuner is synchronized with the audio output of the automobile radio; and
recording the audio output of the radio tuner to an audio storage device, wherein the comparing includes:
sampling the audio output from the radio tuner;
sampling the audio output from the automobile radio;
accumulating resultants of the sampling; and
identifying a synchronization based on a threshold associated with the resultants.

14. The method of claim 13 further comprising playing back the recorded audio output from the audio storage device.

15. The method of claim 14 wherein the recorded audio output is played back from the audio storage device through the automobile radio.

16. The method of claim 13 wherein operation of the audio recorder is activated by voice commands.

17. A system comprising:
an automobile radio and an audio recorder interfaced with the automobile radio, the audio recorder including:
a radio tuner that receives radio frequency signals and converts the signals to audio output;
an audio comparator that compares audio output from the radio tuner with audio output of the automobile radio and tunes the radio tuner until the audio output of the audio tuner is synchronized with the audio output of the automobile audio; and
an audio storage device activatable by the audio comparator to record the audio output of the radio tuner, wherein the comparing includes:
sampling the audio output from the radio tuner;
sampling the audio output from the automobile radio;
accumulating resultants of the sampling; and
identifying a synchronization based on a threshold associated with the resultants.

18. The system of claim 17 further including an audio playback device for playing back audio output recorded in the audio storage device.

19. An audio recorder that interfaces with an automobile radio comprising:
a radio tuner;
means for comparing an output of the radio tuner with an output from the automobile radio;
means for tuning the radio tuner until the output of the radio tuner is synchronized with the output from the automobile radio; and
means for storing the output of the radio tuner for playback.

20. The audio recorder of claim 19, further comprising means for detecting output from the automobile radio and directing the output to the means for comparing.

21. The audio recorder of claim 19, further comprising means for detecting user input to the audio recorder.

* * * * *